United States Patent [19]
Grotjahn et al.

[11] Patent Number: 5,647,207
[45] Date of Patent: Jul. 15, 1997

[54] INTERNAL-COMBUSTION ENGINE INCLUDING A CYLINDER SHUT-OFF AND EXHAUST GAS CATALYSTS

[75] Inventors: Ulrich Grotjahn, Karlsfeld; Stephan Knips, Munich; Guenter Koch, Augsburg; Stephan Missy, Scheyern; Bernd Plodek, Pfaffenhofen; Rainer Zimmer, Neuried, all of Germany

[73] Assignee: Bayerische Motoren Werke AG, Munich, Germany

[21] Appl. No.: 492,144

[22] Filed: Jun. 19, 1995

[30] Foreign Application Priority Data

Jun. 17, 1994 [DE] Germany ............... 44 21 257.7

[51] Int. Cl.$^6$ ................................ F01N 3/28
[52] U.S. Cl. .......................... 60/300; 123/198 F
[58] Field of Search ............ 60/284, 288, 300; 123/198 F

[56] References Cited

U.S. PATENT DOCUMENTS

| | | |
|---|---|---|
| 3,943,710 | 3/1976 | Lange . |
| 4,107,921 | 8/1978 | Iizuka ........................... 60/288 |
| 4,287,716 | 9/1981 | Schuster et al. . |
| 4,305,249 | 12/1981 | Schmid et al. ................ 60/274 |
| 4,926,634 | 5/1990 | Pütz et al. . |
| 5,325,666 | 7/1994 | Rutschmann ................. 60/288 |
| 5,384,098 | 1/1995 | Morikawa . |

FOREIGN PATENT DOCUMENTS

| | | |
|---|---|---|
| 2242899 | 3/1974 | Germany . |
| 2838682 | 3/1980 | Germany . |
| 6159045 | 6/1994 | Japan ........................ 60/288 |
| 1686198 | 10/1991 | U.S.S.R. . |

OTHER PUBLICATIONS

Japanese Abstract No. 56–149801, vol. 6, No. 137 (M–222) [1282], Jun. 15, 1983.
Japanese Abstract No. 58–051212, vol. 7, No. 137 (M–222), Jun. 15, 1983.
Japanese Abstract No. 49–074321, vol. 8, No. 182 (M–319), Aug. 22, 1984.

*Primary Examiner*—Douglas Hart
*Attorney, Agent, or Firm*—Evenson, McKeown, Edwards & Lenahan, P.L.L.C.

[57] ABSTRACT

The two cylinder groups of an internal-combustion engine each have a separate exhaust gas catalyst. When one of these cylinder groups is shut off by preventing the supply of fuel, it is possible that the assigned exhaust gas catalyst may be cooled below its operating temperature. In order to avoid this, the whole exhaust gas system is constructed in such a manner that the gases emitted from the shut-off cylinder group are heated by the exhaust gases of the continuously fired cylinder group.

8 Claims, 1 Drawing Sheet

INTERNAL-COMBUSTION ENGINE INCLUDING A CYLINDER SHUT-OFF AND EXHAUST GAS CATALYSTS

BACKGROUND AND SUMMARY OF THE INVENTION

This invention relates to an internal-combustion engine including at least two cylinder groups or cylinders to which one separate exhaust gas pipe respectively is assigned which has a catalytic emission control system and which is a component of an exhaust gas system. The internal-combustion engine further includes a device for shutting-off a cylinder group by preventing the fuel supply while the charge cycle of this cylinder group is maintained. The term "cylinder group" is to also explicitly include a single cylinder when a separate exhaust gas pipe with an individual, so-called exhaust gas catalyst, is assigned to it.

An internal-combustion engine, such as is known from German Patent document DE-OS 22 42 899, has the disadvantage that the catalytic emission control system of the cylinder group which can be shut-off will cool when this cylinder group is shut off. Furthermore, a charge cycle takes place in this shut-off cylinder group; that is, fresh gas is charged into the combustion spaces of the cylinders, is compressed, and is pushed out again. For reasons of simplicity, the cylinder shut-off does not take place by stopping some control elements/charge cycle valves for the load change but only by means of preventing the supply of fuel to the combustion spaces or cylinders of the shut-off cylinder group.

On the other hand, catalytic emission control systems (exhaust gas catalysts) require a certain operating temperature above which they become capable of converting harmful exhaust gas constituents. When a cylinder group is shut-off, a gas flow continues to pass through the assigned exhaust gas catalyst. This results in its cooling since this gas flow was naturally not significantly heated in the unfired cylinders. In this case, it is possible that the temperature of the exhaust gas catalyst may fall below its operating temperature. When subsequently the previously shut-off cylinder group is again connected; that is, subsequently not only fresh gas but fuel is fed to this cylinder group, then its exhaust gas catalyst will at first not be able to convert the pollutants of the exhaust gas but must first be brought to its operating temperature by means of the then hot exhaust gases.

There are therefore needed measures by which a cooling of the catalytic emission control device of the shut-off cylinder group can be avoided.

These needs are met by constructing the whole exhaust system in such a manner that the gases emitted from the shut-off cylinder group are heated by the exhaust gases of the continuously fired cylinder group.

It is an advantage of the present invention that the exhaust gas of the fired cylinder group of the catalytic emission control system is supplied to the shut-off cylinder group.

It is a further advantage of the present invention that the catalytic emission control system of the shut-off cylinder group has at least two monoliths arranged in series. The exhaust gases of the fired cylinder group are introduced downstream of the first monolith.

Yet another advantage of the present invention occurs by removing the gases emitted from the shut-off cylinder group upstream of the assigned catalytic emission control system. These removed gases are introduced into the exhaust gas pipe of the fired cylinder group.

Still yet another advantage of the present invention provides the catalytic emission control device of the fired cylinder group with at least two monoliths arranged in series. The gases emitted from the shut-off cylinder group are introduced downstream of the first monolith.

It is a further advantage of the present invention to provide the catalytic emission control system of the shut-off cylinder group with a heat-transmitting connection with the catalytic emission control system of the continuously fired cylinder group.

It is yet another further advantage of the present invention to provide one of the catalytic emission control systems with a hollow construction which envelopes the other catalytic emission control system.

A further advantage of the present invention provides for the combination of the exhaust gas pipes of the individual cylinder groups downstream of the catalytic emission control systems to form a common exhaust gas pipe.

Other objects, advantages and novel features of the present invention will become apparent from the following detailed description of the invention when considered in conjunction with the accompanying drawings.

DETAILED DESCRIPTION OF THE DRAWINGS

Figure 1:
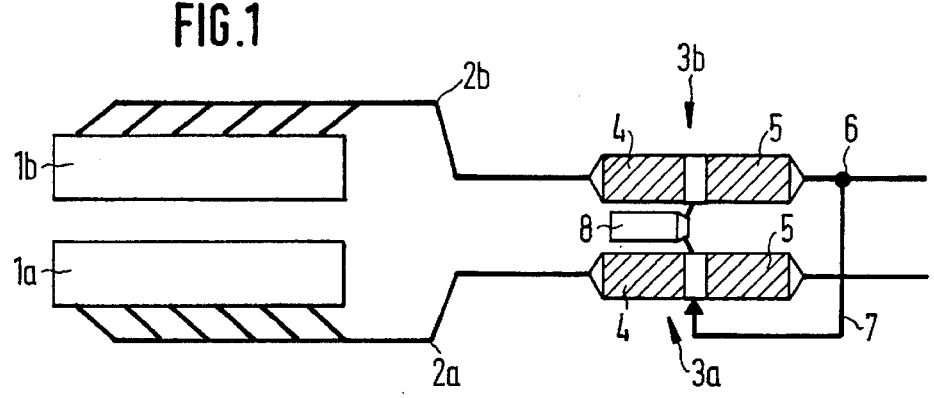
FIG. 1 is a basic schematic diagram of a first embodiment according to the present invention.
Figure 2:
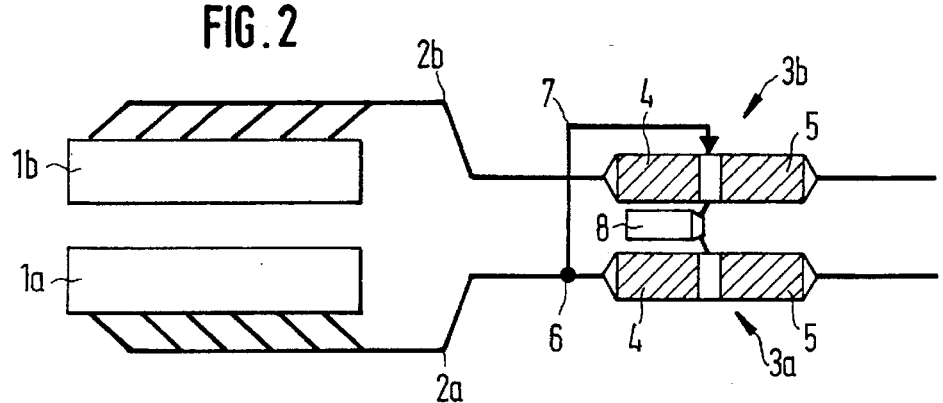
FIG. 2 is a basic schematic diagram of a second embodiment according to the present invention.
Figure 3:
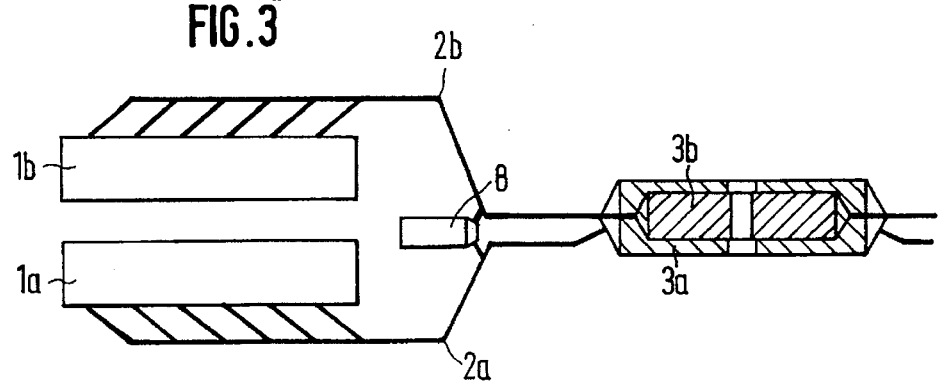
FIG. 3 is a basic schematic diagram of a third embodiment according to the present invention.

The invention will be explained in detail by means of basic diagrams of three preferred embodiments. In FIGS. 1, 2, 3, the respective identical structural members have the same reference numbers.

An internal-combustion engine, which is not shown in detail, comprises two cylinder groups 1a, 1b which may each, for example, have six cylinders. This internal-combustion engine may be a so-called V12-engine. An exhaust gas pipe 2a, 2b is assigned to each cylinder group 1a, 1b. As illustrated, the exhaust gases emitted by the individual cylinders are collected in these exhaust gas pipes 2a, 2b. The fresh gas supply to the individual cylinders is not shown because it is not important for the purpose of the present invention.

A catalytic emission control system 3a, 3b is arranged in each of the exhaust pipes 2a, 2b. These catalytic emissions control systems 3a, 3b are constructed as conventional exhaust gas catalysts and in each case have two monoliths 4, 5 respectively arranged in series. In the illustrated embodiments, the separated exhaust gas pipes 2a, 2b are continued in a separated manner downstream of the exhaust gas catalysts 3a, 3b, however, these exhaust gas pipes 2a, 2b may also be combined to form a common exhaust gas pipe downstream of the exhaust gas catalysts 3a, 3b.

The cylinder group 1a may be shut off at different operating points of the internal-combustion engine, while the cylinder group 1b must always be continuously fired. This measure is taken in order to increase the overall efficiency of the internal-combustion engine during low load points. In this case, the shutting-off of the cylinder group 1a takes place in that no more fuel is fed to this cylinder group while the charge cycle through this cylinder group is maintained. When the gases emitted from the shut-off cylinder group 1a are now guided through its exhaust gas catalyst 3a, as indicated above, this exhaust gas catalyst 3a will cool and may therefore be inoperative in the case of a later restarting of this cylinder group 1a. The following different measures can be taken in order to prevent this.

In the case of the embodiment according to FIG. 1, the exhaust gas of the fired cylinder group 1b is supplied to the catalytic emission control system 2a of the shut-off cylinder group 1a. For this purpose, a bypass valve 6 is provided in the exhaust gas pipe 2b downstream of the exhaust gas catalyst 3b. The bypass valve 6 introduces the exhaust gas flow of the fired cylinder group 1b, purified in the catalytic emission control system 3b, according to the indicated arrow, by way of a branch pipe 7, directly into the exhaust gas catalyst 3a of the shut-off cylinder group 1a. In this exhaust gas catalyst 3a, the hot exhaust gas flow of the continuously fired cylinder group 1b will then mix with the relatively cold gas flow emitted from the shut-off cylinder group 1a. This leads to a heating of the gas flow and thus prevents an extreme cooling of the exhaust gas catalyst 3a.

In this embodiment according to FIG. 1, the branch pipe 7 leads out between the two monoliths 4, 5 of the exhaust gas catalyst 3a; that is, the mouth of this branch pipe 7 is situated downstream of the first monolith 4 of the exhaust gas catalyst 3a. Although, as a result, the first monolith 4 of this exhaust gas catalyst 3a is cooled when the cylinder group 1a is shut off, the second monolith 5 of this exhaust gas catalyst is not cooled. Thus, it is ensured that after a connecting of this cylinder group 1a, a conversion of harmful exhaust gas constituents can take place immediately at least in the second monolith-5 of the exhaust gas catalyst 3a. On the other hand, by means of the indicated introduction of the exhaust gas flow of the cylinder group 1b downstream of the first monolith 4 of the exhaust gas catalyst 3a, this first monolith 4 is spared. Advantageously, as a result of this measure, the useful life of the monolith 4, during which this monolith is to have a sufficient conversion rate, will be extended.

Also in the embodiment according to FIG. 2, a bypass valve 6 and a branch pipe 7 are provided. However, in this case, the bypass valve 6 is situated in the exhaust gas pipe 2a of that cylinder group 1a which is to be shut off. Thus, the gases emitted from the shut-off cylinder group 1a are discharged upstream of the assigned catalytic emission control system 3a from the exhaust gas pipe 2a and are introduced by way of the branch pipe 7 into the exhaust gas pipe 2b of the fired cylinder group 1b. As a result of this measure, the monoliths 4, 5 of the exhaust gas catalyst 3a are not at all acted upon by a gas flow when the assigned cylinder group 1a is shut off so that, as a result, no intensive cooling of this exhaust gas catalyst 3a can take place.

The introduction of the gas flow emitted from the shut-off cylinder group 1a into the exhaust gas pipe 2b, in this case, may take place upstream as well as downstream of the exhaust gas catalyst 3b. Likewise, the gas flow emitted from the shut-off cylinders 1a may be introduced directly into the exhaust gas catalyst 3b, as illustrated in FIG. 2. Because of the fact that, according to the illustrated embodiment, the gases emitted from the shut-off cylinder group 1a are introduced into the exhaust gas catalyst downstream of the first monolith 4 of the exhaust gas catalyst 3b, pollutants, which are contained in this gas flow, can advantageously be converted in the second monolith 5 of the exhaust gas catalyst 3b.

If—which would also be possible—the gases emitted from the shut-off cylinder group 1a were introduced into the exhaust gas pipe 2b upstream of the exhaust gas catalyst 3b, the first monolith 4 of the exhaust gas catalyst 3b would be acted upon in an intensified manner; furthermore, as a result, it is possible that the temperature of the monolith may fall below its operating temperature.

In contrast, downstream of the monolith 4, the exhaust gas flow of the continuously operated cylinder group 1b, with respect to the temperature, is increased by the conversion so that the mixing temperature, which occurs as a result of the introduction of the exhaust gas of the shut-off cylinder group 1a, will always still be sufficiently high. For these reasons, the illustrated arrangement is particularly advantageous.

In the case of the embodiment according to FIG. 3, the catalytic emission control system 3a of the shut-off cylinder group 1a is in a heat-transmitting connection with the catalytic exhaust gas emission control system 3b of the continuously fired cylinder group 1b. A bypassing of the exhaust gases from one exhaust gas pipe to another exhaust gas pipe therefore does not take place in this case; nevertheless, it is successfully avoided that, when the cylinder group 1a is shut off, the gases emitted from this cylinder group 1a cool the pertaining exhaust gas catalyst 3a in an unacceptable manner because heat is constantly supplied to this exhaust gas catalyst 3a by means of the exhaust gas catalyst 3b to which hot exhaust gases continue to be supplied from the cylinder group 1b which is fired in a constant manner.

As illustrated, the two catalytic emission control systems 3a, 3b are arranged concentrically with respect to one another; that is, the exhaust gas catalyst 3a has a hollow construction and envelopes the exhaust gas catalyst 3b. The waste heat of the exhaust gas catalyst 3b is therefore necessarily always introduced into the exhaust gas catalyst 3a, which has the result that this exhaust gas catalyst 3a can no longer cool to below its operating temperature even when its assigned cylinder group is shut off; that is, is not fired.

For the sake of completeness, it should be mentioned that the entire exhaust system of the internal-combustion engine, consisting of the exhaust gas pipes 2a, 2b as well as of the exhaust gas catalysts 3a, 3b may have a burner 8 by means of which, following a cold start of the internal-combustion engine, the exhaust gas catalysts 3a, 3b can rapidly be brought to their operating temperature. In this case, the exhaust gases of this burner 8 are introduced by way of the illustrated stub pipes in a direct or indirect manner into the two exhaust gas catalysts 3a, 3b. However, this detail and other details, particularly those of a constructive type, may have designs which differ from the embodiments, without departing from the content of the claims.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An internal-combustion engine having at least two cylinder groups or cylinders to each of which one separate exhaust gas pipe respectively is assigned which has a catalytic emission control system forming a component of an exhaust gas system, as well as having a device for shutting off one of said at least two cylinder groups by preventing a supply of fuel to said one cylinder group while maintaining a charge cycle through the one cylinder group, wherein said exhaust gas system is constructed such that gases emitted by said one shut-off cylinder group are heated by exhaust gases of a continuously fired one of said at least two cylinder groups; and wherein exhaust gas of the continuously fired cylinder group is supplied to the catalytic emission control system of the shut-off cylinder group.

2. Internal-combustion engine according to claim 1, wherein the catalytic emission control system of the shut-off cylinder group has at least two monoliths arranged in series, and wherein exhaust gases of the fired cylinder group are introduced downstream of a first of the at least two monoliths.

3. An internal-combustion engine having at least two cylinder groups or cylinders to each of which one separate exhaust gas pipe respectively is assigned which has a catalytic emission control system forming a component of an exhaust gas system, as well as having a device for shutting off one of said at least two cylinder groups by preventing a supply of fuel to said one cylinder group while maintaining a charge cycle through the one cylinder group, wherein said exhaust gas system is constructed such that gases emitted by said one shut-off cylinder group are heated by exhaust gases of a continuously fired one of said at least two cylinder groups; and wherein gases emitted from the shut-off cylinder group are removed upstream of the associated catalytic emission control system and are introduced into the exhaust gas pipe of the fired cylinder group.

4. Internal-combustion engine according to claim 3, wherein the catalytic emission control device of the fired cylinder group has at least two monoliths arranged in series, and wherein gases emitted from the shut-off cylinder group are introduced downstream of a first of the at least two monoliths.

5. Internal-combustion engine according to claim 1, wherein the exhaust gas pipes of the at least two individual cylinder groups are combined downstream of the catalytic emission control systems to form a common exhaust gas pipe.

6. Internal-combustion engine according to claim 2, wherein the exhaust gas pipes of the at least two individual cylinder groups are combined downstream of the catalytic emission control systems to form a common exhaust gas pipe.

7. Internal-combustion engine according to claim 3, wherein the exhaust gas pipes of the at least two individual cylinder groups are combined downstream of the catalytic emission control systems to form a common exhaust gas pipe.

8. Internal-combustion engine according to claim 4, wherein the exhaust gas pipes of the at least two individual cylinder groups are combined downstream of the catalytic emission control systems to form a common exhaust gas pipe.

* * * * *